United States Patent
Froman

(10) Patent No.: US 10,442,539 B2
(45) Date of Patent: Oct. 15, 2019

(54) ANTI-ICE SYSTEM FOR THERMALLY FRAGILE MATERIALS

(71) Applicant: Bell Helicopter Textron Inc., Fort Worth, TX (US)

(72) Inventor: Gary S. Froman, Ft. Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 302 days.

(21) Appl. No.: 15/594,360

(22) Filed: May 12, 2017

(65) Prior Publication Data

US 2018/0327100 A1 Nov. 15, 2018

(51) Int. Cl.
| | |
|---|---|
| B64D 15/12 | (2006.01) |
| H05B 1/02 | (2006.01) |
| H05B 3/34 | (2006.01) |
| B64D 15/20 | (2006.01) |
| B64C 11/20 | (2006.01) |
| B64C 29/00 | (2006.01) |

(52) U.S. Cl.
CPC .............. *B64D 15/12* (2013.01); *B64C 11/20* (2013.01); *B64D 15/20* (2013.01); *H05B 1/0236* (2013.01); *H05B 3/34* (2013.01); *B64C 29/0033* (2013.01); *H05B 2214/02* (2013.01)

(58) Field of Classification Search
CPC ......... B64D 15/12; B64D 15/20; B64C 11/20; B64C 19/00; B64C 29/0033; H05B 1/0236; H05B 3/34
USPC .................................................. 244/134 R
See application file for complete search history.

(56) References Cited

U.S. PATENT DOCUMENTS

| | | | | |
|---|---|---|---|---|
| 4,458,137 A | * | 7/1984 | Kirkpatrick | G01P 5/165 219/201 |
| 4,524,264 A | * | 6/1985 | Takeuchi | G05D 23/2401 219/209 |
| 5,704,567 A | * | 1/1998 | Maglieri | B64D 15/12 244/134 D |
| 6,194,685 B1 | * | 2/2001 | Rutherford | B64D 15/14 219/201 |
| 8,969,765 B2 | | 3/2015 | Froman et al. | |
| 2007/0295712 A1 | * | 12/2007 | Forman | B64D 15/14 219/492 |
| 2008/0152494 A1 | * | 6/2008 | Froman | B64D 15/12 416/95 |
| 2008/0302910 A1 | * | 12/2008 | Calamvokis | B64C 1/067 244/118.5 |
| 2011/0297789 A1 | * | 12/2011 | Gallman | B64D 15/14 244/134 R |
| 2012/0234816 A1 | * | 9/2012 | Petrenko | H05B 3/84 219/203 |

(Continued)

FOREIGN PATENT DOCUMENTS

EP 2866516 4/2015

*Primary Examiner* — Claude J Brown
(74) *Attorney, Agent, or Firm* — Patent Capital Group

(57) ABSTRACT

In one embodiment, a system may comprise an electro-thermal heating element and a controller. The electro-thermal heating element may be configured to heat a structure, and the controller may be configured to: identify a target temperature for the structure; identify a target rate of temperature change for the structure; identify a target voltage for heating the structure at the target rate of temperature change; and apply the target voltage to the electro-thermal heating element.

23 Claims, 6 Drawing Sheets

(56) References Cited

U.S. PATENT DOCUMENTS

| | | | |
|---|---|---|---|
| 2012/0269227 A1* | 10/2012 | Stothers | G01K 17/00 |
| | | | 374/3 |
| 2014/0191083 A1 | 7/2014 | Carpino, II | |
| 2014/0191084 A1* | 7/2014 | Gambino | B64D 15/12 |
| | | | 244/134 D |
| 2015/0108233 A1* | 4/2015 | Wright | B64D 13/08 |
| | | | 237/12.3 R |
| 2015/0110149 A1* | 4/2015 | Begin-Drolet | G01N 25/04 |
| | | | 374/16 |
| 2019/0003463 A1* | 1/2019 | Buggy | F03D 80/40 |
| 2019/0113025 A1* | 4/2019 | Badger | H05B 3/34 |

* cited by examiner

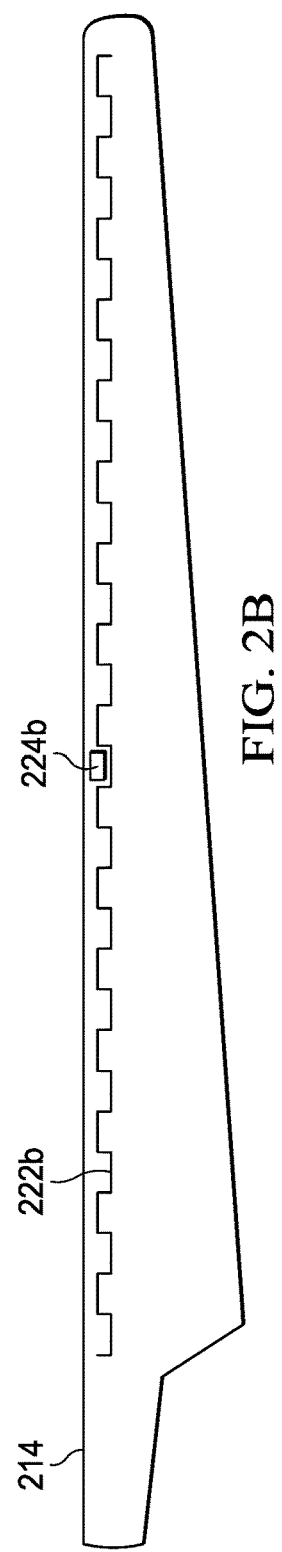

ANTI-ICE SYSTEM FOR THERMALLY FRAGILE MATERIALS

TECHNICAL FIELD

This disclosure relates generally to anti-ice systems, and more particularly, though not exclusively, to an anti-ice system for thermally fragile materials.

BACKGROUND

During flight, an aircraft often encounters moisture at low ambient air temperatures, which may cause ice to form on the aircraft. Ice accumulation can negatively impact the performance of the aircraft and/or may be hazardous. Accordingly, an anti-ice system may be used to heat certain components of the aircraft to prevent ice from forming or accumulating. In some cases, however, aircraft components can be damaged by an anti-ice system due to overheat or rapid temperature changes.

SUMMARY

According to one aspect of the present disclosure, a system may comprise an electro-thermal heating element and a controller. The electro-thermal heating element may be configured to heat a structure, and the controller may be configured to: identify a target temperature for the structure; identify a target rate of temperature change for the structure; identify a target voltage for heating the structure at the target rate of temperature change; and apply the target voltage to the electro-thermal heating element.

BRIEF DESCRIPTION OF THE DRAWINGS

FIGS. 2A-B illustrate example embodiments of aircraft components with electro-thermal heating blankets.

DETAILED DESCRIPTION

Figure 1:
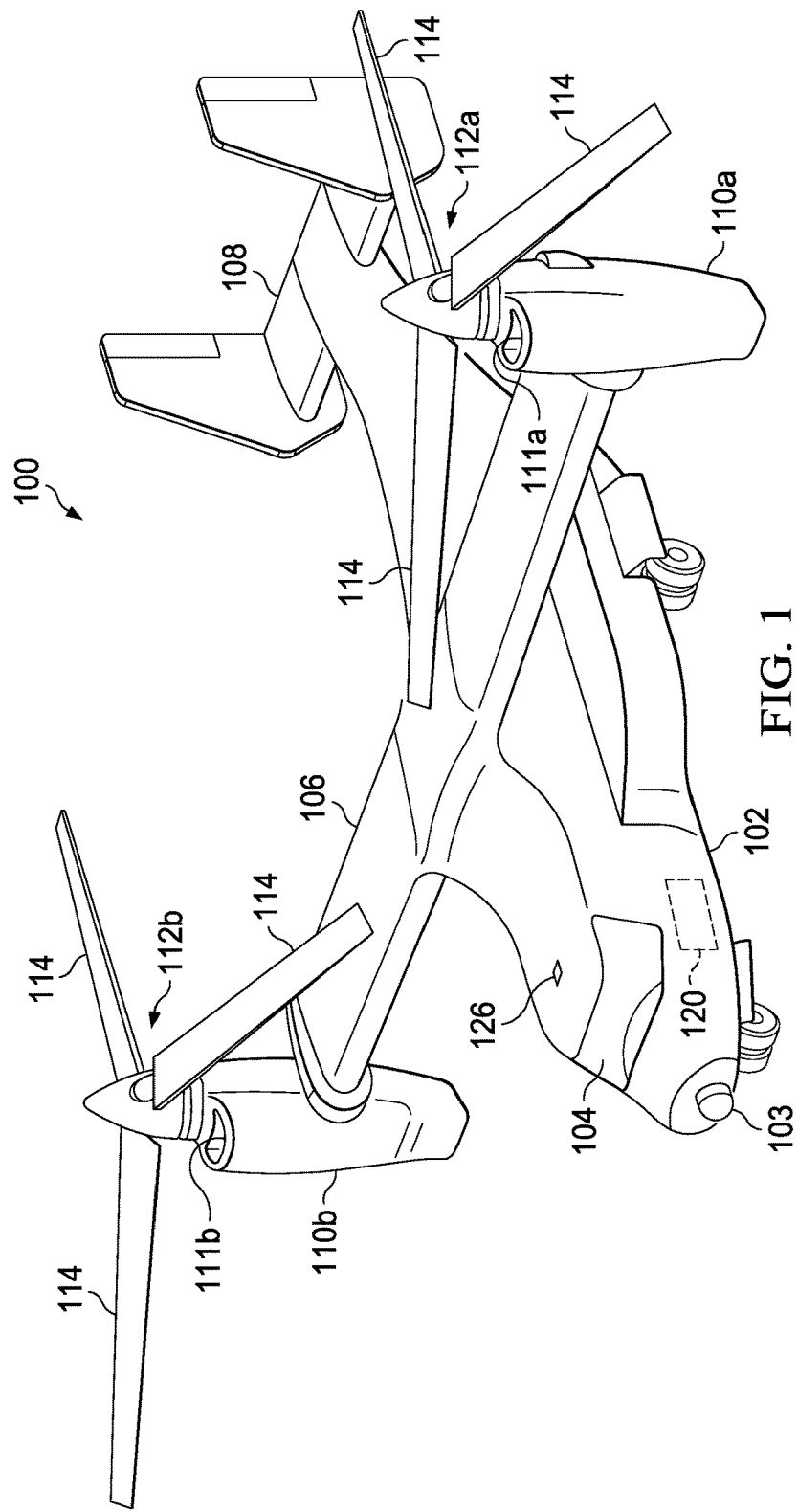
FIG. 1 illustrates an example embodiment of an aircraft with an anti-ice system.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a tiltrotor aircraft 100 with an anti-ice system. Tiltrotor aircraft 100 includes a fuselage 102, a wing 106, nacelles 110a and 110b, and an empennage 108. The fuselage 102 is the main body of tiltrotor aircraft 100, and may include a cabin for the crew, passengers, and/or cargo, and may also house certain mechanical and electrical components, such as the engine(s), transmission, and flight controls. Nacelles 110a and 110b respectively include rotor systems 112a and 112b, and each rotor system 112a-b includes a plurality of rotor blades 114. Moreover, each nacelle 110a and 110b may include an engine and gearbox for driving rotor systems 112a and 112b, respectively. In some embodiments, nacelles 110a and 110b may each be configured to alternate between a helicopter mode, in which the nacelles are approximately vertical, and an airplane mode, in which the nacelles are approximately horizontal. The empennage 108 is the tail assembly of tiltrotor aircraft 100, and includes horizontal and vertical stabilizers in order to provide improved stability and control.

Tiltrotor aircraft 100 also includes an anti-ice system 120 to prevent ice from forming on certain components, such as radome 103, windshield 104, engine inlets 111a-b, wing 106, and/or rotor blades 114. During flight, an aircraft often encounters moisture at low ambient air temperatures, particularly when flying at high speeds, which may cause ice to form on the aircraft. Ice accumulation can negatively impact the performance of an aircraft and may become hazardous. For example, ice on windshield 104 can reduce pilot visibility, ice on rotor blades 114 and/or wing 106 can reduce the amount of lift produced, ice on radome 103 can obstruct or inhibit radar operations, and ice on engine inlets 111 can reduce engine airflow and/or cause damage if the ice is sucked through the engine. Accordingly, an aircraft may include an anti-ice system to prevent ice from forming or accumulating by heating certain components of the aircraft. In some cases, however, an anti-ice system can damage aircraft components due to overheat or rapid temperature changes. For example, a component can be damaged by thermal stress if the component is heated above a maximum tolerable temperature, or if the component is heated or cooled too quickly. Accordingly, this disclosure describes various embodiments of an anti-ice system that avoids damage to thermally fragile materials.

In the illustrated embodiment, for example, anti-ice system 120 can be used to prevent ice from forming on certain components of tiltrotor aircraft 100, without damaging any thermally fragile materials associated with those components. In some embodiments, for example, each aircraft component that requires anti-icing is embedded with an electro-thermal heating blanket (e.g., as shown and described in connection with FIGS. 2A-B). Anti-ice system 120 can supply voltage to the electro-thermal heating blankets to heat the surface of the associated aircraft components (e.g., when icing conditions are detected). Moreover, anti-ice system 120 can regulate the voltage supplied to the heating blankets in order to prevent thermal stress and damage to the associated aircraft components. In some embodiments, for example, anti-ice system 120 may include a temperature sensor 126 to measure the ambient temperature (e.g., the outside air temperature (OAT)), and may also include temperature sensors to measure the temperature of each heated component or surface (e.g., temperature sensors 224 of FIGS. 2A-B). For example, the surface of each heated component may be embedded with a temperature sensor to provide feedback of the surface temperature to anti-ice system 120. In this manner, anti-ice system 120 can use the embedded temperature sensor(s) to determine when a heated surface reaches a certain target temperature. The target temperature for a particular surface may depend on the material that it is made from, and may be determined based on respective temperatures that prevent ice from forming on the material and that cause damage to the material. For example, the destruct temperature of a particular material is the maximum temperature that the material can tolerate without being damaged, which may vary based on the type of material. A particular material may be permanently damaged if its destruct temperature is exceeded, or if its temperature changes too rapidly. Accordingly, thermally fragile materials endure less thermal stress when the target temperature and the temperature rate of change are kept as low as possible. Accordingly, anti-ice system 120 dynamically configures the target temperature of a heated surface based on the type of material and the current aircraft conditions (e.g., aircraft speed and ambient temperature), and anti-ice system 120 also modulates the voltage supplied to the associated heating blanket to limit the temperature rate of change of the heated surface. In this manner, the target temperature of the heated surface changes based on aircraft conditions so that only the required amount of heat is applied to the surface material, thus avoiding damage due to overheating and/or thermal stress. Moreover, the temperature rate of change of the heated surface is minimized, thus extending the life of the surface material. For example, in some embodiments, the voltage of the heating blanket can be modulated in order to control the rate at which the surface is heated. In this manner, the temperature rate of change of the heated surface can follow a predetermined heating profile in order to heat the surface at a gradually slower rate as its temperature approaches and/or exceeds the target temperature. The appropriate temperature rate of change may depend on the type of material, the target temperature, and/or the current surface temperature. For example, in some embodiments, various control bands may be defined for different temperature ranges relative to the target temperature, and a particular temperature rate of change may be used for each control band.

The embodiments of the anti-ice system described throughout this disclosure provide numerous technical advantages. For example, the described embodiments can be used to prevent ice from forming on an aircraft by heating the surface of an aircraft and/or certain components, thus improving the performance and safety of the aircraft. Moreover, the described embodiments prevent heated surfaces from being thermally stressed and/or damaged (e.g., due to overheating or rapid temperature changes), thus extending the life of the aircraft and its components, and similarly reducing costs. The described embodiments also adapt to real-time flight conditions to generate the appropriate amount of heat regardless of the circumstances, thus accommodating changing conditions such as wet versus dry weather. In this manner, the described embodiments allow desired aircraft components to remain both ice free and undamaged, even for components that are made of thermally fragile materials.

Example embodiments of the anti-ice system are described below with more particular reference to the remaining FIGURES. Moreover, it should be appreciated that tiltrotor aircraft 100 of FIG. 1 is merely illustrative of a variety of aircraft that can be used with embodiments described throughout this disclosure. Other aircraft implementations can include, for example, fixed wing airplanes, hybrid aircraft, unmanned aircraft, rotorcraft, gyrocopters, a variety of helicopter configurations, and drones, among other examples. The embodiments described throughout this disclosure can similarly be implemented in any other type of vehicle, including land-based vehicles and water-based vehicles.

Figure 2A:
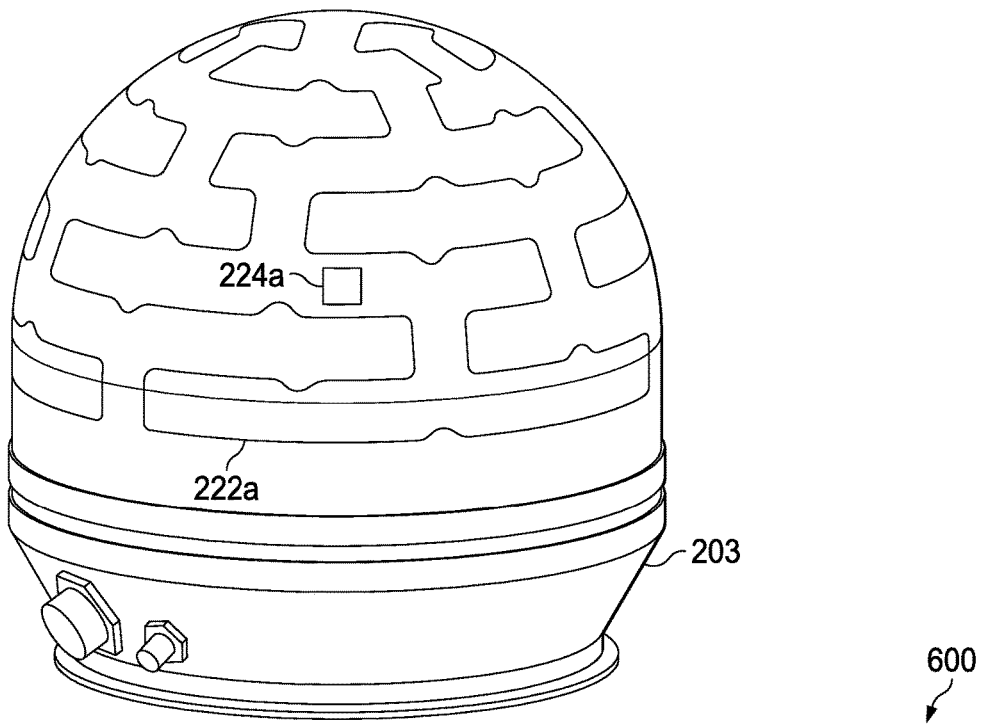

FIGS. 2A-B illustrate example embodiments of aircraft components with electro-thermal heating blankets. In some embodiments, for example, aircraft components with electro-thermal heating blankets may be used to implement an anti-ice system for an aircraft (e.g., anti-ice system 120 of aircraft 100 from FIG. 1). FIG. 2A illustrates a radome 203, and FIG. 2B illustrates a rotor blade 214. The surfaces of radome 203 and rotor blade 214 are each embedded with an electro-thermal heating blanket 222 and a temperature sensor 224. In particular, the surface of radome 203 is embedded with electro-thermal heating blanket 222a and temperature sensor 224a, and the surface of rotor blade 214 is embedded with electro-thermal heating blanket 222b and temperature sensor 224b. Depending on the particular embodiment, radome 203 and/or rotor blade 214 may be embedded with any number or pattern of electro-thermal heating blankets. For example, in the illustrated embodiment, electro-thermal heating blanket 222b is shown as being embedded in the leading edge of rotor blade 214. In other embodiments, however, rotor blade 214 may be embedded with multiple electro-thermal heating blankets along the leading edge and/or any other location of the rotor blade (e.g., chord-wise locations). Electro-thermal heating blankets 222 can be used to heat the surfaces of radome 203 and rotor blade 214, and temperature sensors 224 can be used to measure the surface temperature of radome 203 and rotor blade 214. Similar embodiments can be used for heating other aircraft components.

An electro-thermal heating blanket 222 can be implemented using any conductive element or material capable of converting electricity into heat, such as a resistance wire made of nichrome or another metal heating element. When voltage is supplied, an electric current passes through the electro-thermal heating blanket 222 and encounters resistance, which causes heat to be produced. In the illustrated embodiments, electro-thermal heating blankets 222 are embedded into the surfaces of radome 203 and rotor blade 214 using a wire pattern with spacing that allows the entire surfaces to be heated without being overly invasive. For example, electro-thermal heating blanket 222a is spaced within the surface of radome 203 to avoid interfering with radar operation while being able to heat the entire surface of radome 203.

Temperature sensors 224 can be used to provide feedback to an anti-ice system regarding the surface temperatures of heated components, such as radome 203 and rotor blade 214. In this manner, the anti-ice system can regulate the voltage applied to electro-thermal heating blankets 222 to control the temperature rate of change of radome 203 and rotor blade 214. The temperature rate of change often depends on the watt density of the heating blanket, the heat transfer rate of the heating blanket to the surface material, and the heat transfer rate of the surface material to the external air/icing environment. In some cases, application of full power to the heating blankets 222 may cause damage to the heated material because the temperature rate of change is too high and the material becomes thermally stressed. Accordingly, in some embodiments, the temperature rate of change of a heated surface can follow a predetermined heating profile that heats the surface at a gradually slower rate as its temperature approaches and/or exceeds the target temperature.

Figure 3:
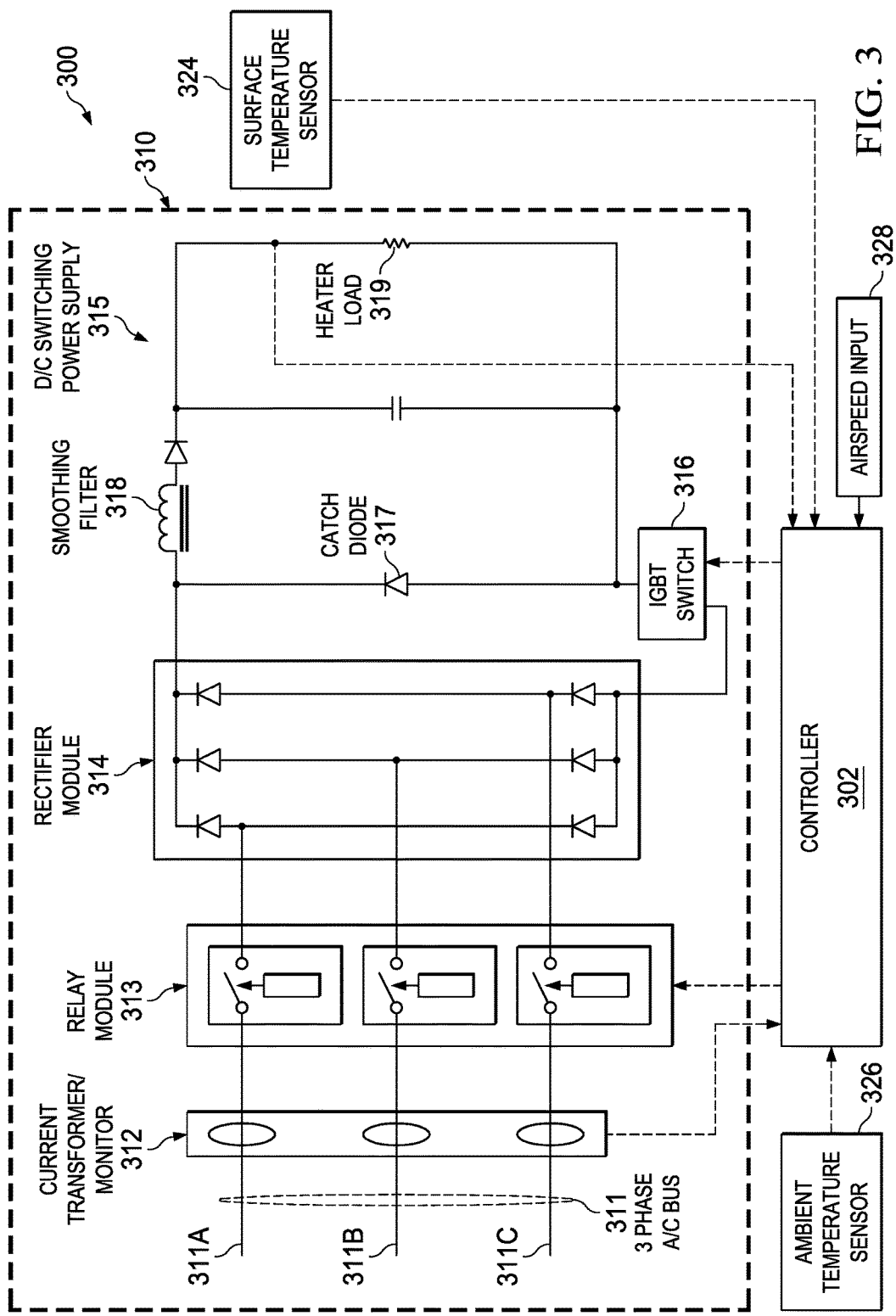
FIG. 3 illustrates an example implementation of an anti-ice system.

FIG. 3 illustrates an example implementation of an anti-ice system 300. In the illustrated embodiment, anti-ice system 300 includes controller 302, heating circuit 310, surface temperature sensor 324, and ambient temperature sensor 326.

Controller 302 is used to control the operation of anti-ice system 300. In some embodiments, for example, controller 302 may be implemented using a processor, microprocessor, application specific integrated circuit (ASIC), field programmable gate array (FPGA), and/or other integrated circuitry. In the illustrated embodiment, controller 302 uses heating circuit 310 to heat a particular surface of an aircraft. For example, in some embodiments, controller 302 may dynamically identify a target temperature for the particular surface. The target temperature may be based on the type of surface material, its destruct temperature, and the current aircraft conditions, including airspeed and ambient temperature (e.g., as provided by airspeed input 328 and ambient temperature sensor 326). For example, the destruct temperature of a particular material is the maximum temperature that the material can tolerate without being damaged, which may vary based on the type of material. By maintaining a heated surface at a temperature substantially lower than its destruct temperature, the life of the aircraft surface is extended. For low airspeeds and ambient temperatures close to freezing, the target temperature may be set to a temperature that is only slightly above freezing. For high airspeeds and for very low ambient temperatures where more heat is required to prevent icing, the target temperature may be raised to a level that is closer to the destruct temperature. However, by keeping the target temperature only slightly higher than freezing during most of the aircraft service life, the aircraft materials in the anti-ice zones endure less thermal stress, thus extending their lifecycle.

In some embodiments, controller 302 may use a lookup table to identify the appropriate target temperature at varying airspeeds and ambient temperatures. An example target temperature lookup table is provided in TABLE 1.

TABLE 1

Target temperature lookup table

| | | Knots | | | | | | | |
|---|---|---|---|---|---|---|---|---|---|
| | | <50 | 75 | 100 | 125 | 150 | 175 | 200 | 225 | 250 |
| Degrees Celsius | 0 | 10 | 15 | 20 | 25 | 30 | 35 | 40 | 45 | 50 |
| | -10 | 15 | 20 | 25 | 30 | 35 | 40 | 45 | 50 | 55 |
| | -20 | 20 | 25 | 30 | 35 | 40 | 45 | 50 | 55 | 60 |
| | -30 | 25 | 30 | 35 | 40 | 45 | 50 | 55 | 60 | 65 |
| | -40 | 30 | 35 | 40 | 45 | 50 | 55 | 60 | 65 | 70 |
| | -50 | 35 | 40 | 45 | 50 | 55 | 60 | 65 | 70 | 80 |

Controller 302 may then modulate the voltage of heating circuit 310 in order to control the rate at which the surface is heated to the target temperature. Depending on the particular embodiment, for example, the applied voltage could be modulated based on amplitude, duty cycle, or any other suitable modulation approach. For example, in some embodiments, controller 302 may heat a surface at a gradually slower rate as the surface temperature approaches and/or exceeds the target temperature. Accordingly, in some embodiments, controller 302 may identify an appropriate temperature rate of change based on the type of material, the target temperature, and/or the current surface temperature (e.g., as measured by surface temperature sensor 324). For example, in some embodiments, various control bands may be defined for different temperature ranges relative to the target temperature, and each control band may use a particular temperature rate of change. In some embodiments, controller 302 may use a lookup table to identify the appropriate rate of change. Controller 302 may then identify the appropriate amount of voltage to heat the surface at the desired rate of change, and controller 302 may configure heating circuit 310 to produce the identified amount of voltage, as described further below. Moreover, in some embodiments, controller 302 may continuously monitor the current surface temperature and the actual temperature rate of change, and may adjust the voltage appropriately. For example, if the current surface temperature enters a new control band, the voltage may be adjusted to achieve the appropriate temperature rate of change for that control band. Moreover, if the actual rate of change differs from the desired rate of change, controller 302 may adjust the voltage appropriately in order to successfully achieve the desired rate of change. Controller 302 may continuously adjust the voltage of heating circuit 310 in this manner in order to maintain the appropriate target temperature and rate of change. This enables anti-ice system 300 to adapt to real-time flight conditions and generate the appropriate amount of heat regardless of the circumstances, thus accommodating changing conditions such as wet versus dry weather.

In the illustrated embodiment, heating circuit 310 includes three-phase alternating current (A/C) power bus 311, current transformer and monitor 312, relay module 313, rectifier module 314, D/C switching power supply 315, and heater load 319. Power is supplied to heating circuit 310 using three-phase A/C power bus 311. Current transformer and monitor 312 is used measure the A/C current sourced to the circuit and provide monitoring for overcurrent and undercurrent feedback to controller 302. Relay module 313 is used by controller 302 to turn the A/C power on and off (e.g., by switching the relay from a non-conducting state to a conducting state, or vice versa). In some embodiments, for example, relay module 313 may include a solid state relay and/or zero cross switching circuit. Rectifier module 314 is used for converting alternating current (A/C) into direct current (D/C). For example, in some embodiments, rectifier module 314 may be used to convert the three-phase A/C power into D/C power. In some embodiments, for example, rectifier module 314 may produce D/C power with voltage of 260 volts D/C at the output terminals of the rectifier module. The D/C power produced by rectifier module 314 is fed into D/C switching power supply 315. D/C switching power supply 315 is used to convert the high voltage D/C power from rectifier module 314 into low voltage D/C power. In some embodiments, for example, D/C switching power supply 315 may be a buck converter. In the illustrated embodiment, D/C switching power supply 315 includes an insulated gate bipolar transistor (IGBT) switch 316, catch diode 317, and smoothing filter 318. As in a buck D/C to D/C converter, IGBT switch 316 can be used to turn the D/C power supply on and off at a high frequency such as 100-200 khz. When the IGBT is switched on, current flows through the inductor and through the heating element and through the IGBT. During this phase, energy is stored in the core of the inductor in the form of magnetic flux. When the IGBT is switched off, the inductor continues to provide current to the circuit from the energy stored in the core of the inductor. When current is switched off by the IGBT, the voltage at the input side of the inductor tries to fly to a negative voltage due to inductance, but is clamped when the catch diode 317 is forward biased. The stored energy of the inductor then continues to flow through the output of the catch diode and through the inductor. In this manner, by varying the on and off times of the IGBT, the D/C voltage output can be modulated to lower voltages.

Smoothing filter 318 may include inductive and/or capacitive elements to smooth out the D/C power and convert it from high voltage to low voltage. Moreover, in some embodiments, smoothing filter 318 can be modulated (e.g., by controlling the IGBT switch 316 to turn the D/C power on and off, as appropriate) in order to control the voltage of the output D/C power (e.g., 5V, 30V, 100V, and so forth). In this manner, the voltage of the D/C power produced by D/C switching power supply 315 can be controlled by controller 302. The resulting D/C power is then fed into heater load elements 319, which then produce heat used for heating the particular surface.

Accordingly, heating circuit 310 is supplied with three-phase A/C power 311, the A/C power is converted into high voltage D/C power by rectifier module 314, the high voltage D/C power is then selectively converted into low voltage D/C power by D/C switching power supply 315, and the low voltage D/C power is then supplied to the heating elements 319. In this manner, rather than simply applying high voltage D/C power on and off, low voltage D/C power is fed to heating elements 319 so that only the required amount of heat is produced, thus avoiding thermal stress to the heated surface.

The configuration of heating circuit 310 results in a balanced generator load and allows heater loads 319 to be configured using a two-wire hookup rather than a delta (Δ) or wye (Y) configuration. Moreover, the hardware required for heating circuit 310 is compact and lightweight compared to a modulated A/C system. Finally, in some embodiments, by modulating the amplitude of the voltage rather than continuously applying full voltage on and off, heating circuit 310 may provide improved temperature control and may reduce thermal stress since full voltage is not applied to the heater loads 319.

Figure 4:
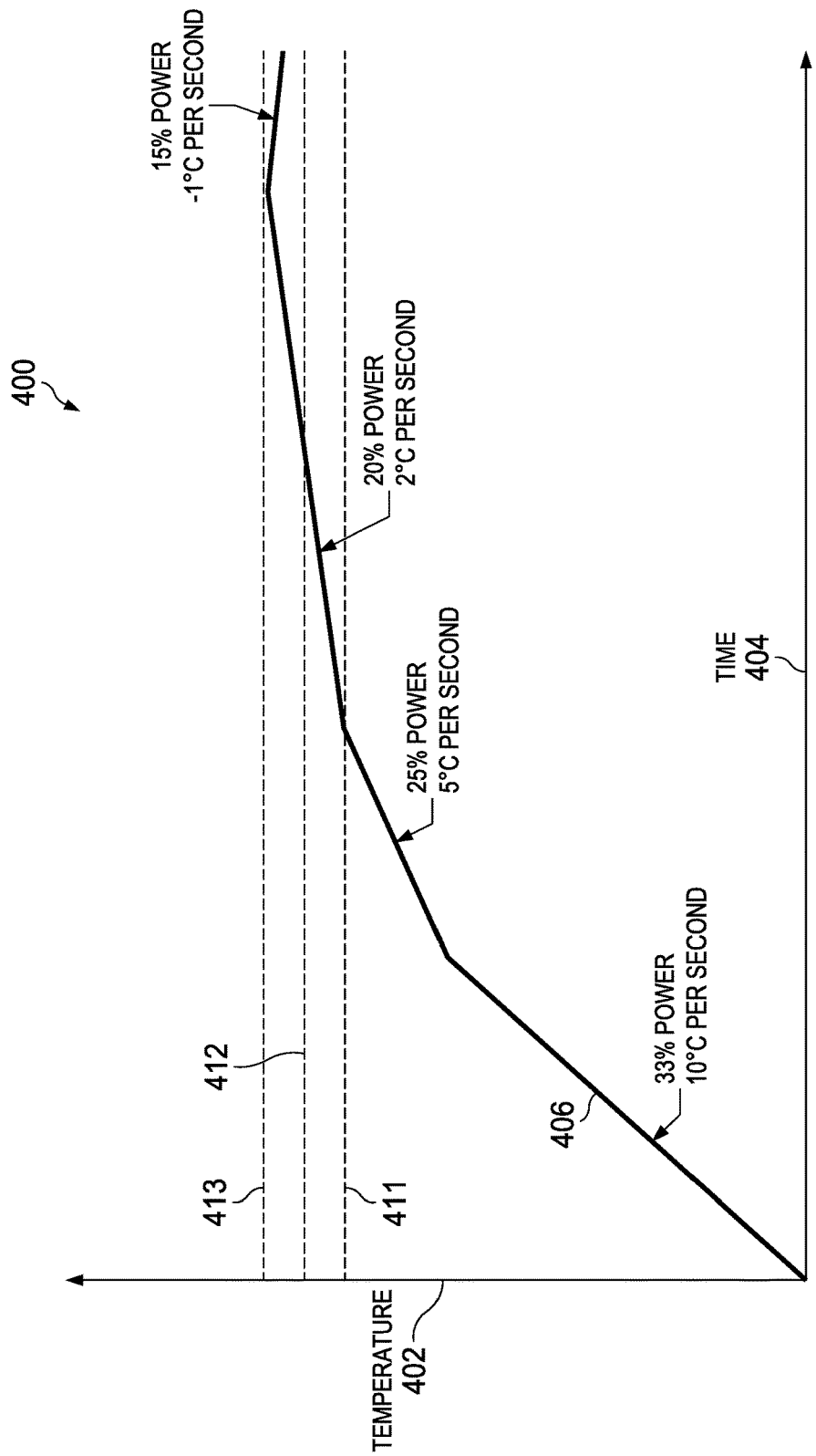
FIGS. 4 and 5 illustrate performance graphs for various embodiments of anti-ice systems.
Figure 5:
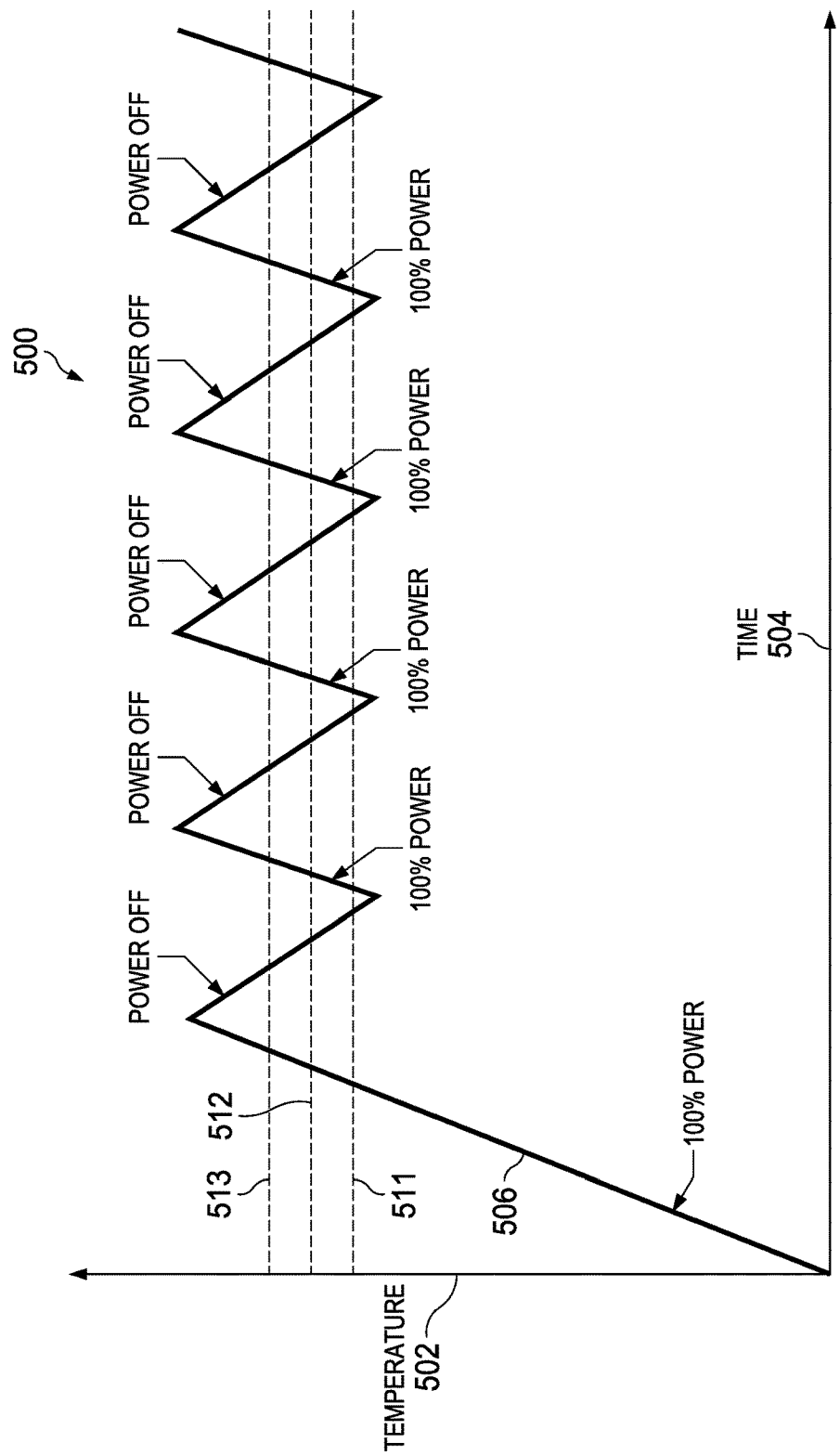

FIGS. 4 and 5 illustrate performance graphs for various embodiments of anti-ice systems. In particular, FIG. 4 illustrates the performance of an anti-ice system that limits the temperature rate of change of a heated surface, and FIG. 5 illustrates the performance of an anti-ice system that does not limits the temperature rate of change of a heated surface.

FIG. 4 illustrates a performance graph 400 for an anti-ice system that limits the temperature rate of change of a heated surface (e.g., anti-ice system 300 of FIG. 3). Graph 400 includes a plot 406 of the temperature 402 of a heated surface over a period of time 404. Graph 400 also identifies a target temperature 412 for the heated surface, an upper control band 413, and a lower control band 411. In some embodiments, for example, the upper control band 413 and lower control band 411 may be a particular number of degrees from the target temperature 412 (e.g., within 3 to 5 degrees from the target temperature).

As shown by graph 400, the anti-ice system heats the surface at a gradually slower rate as the surface temperature approaches and/or exceeds the target temperature. For example, the surface is initially heated at 33% power, which results in a temperature rate of change of +10 degrees Celsius per second. As the temperature approaches the lower control band 411, power is reduced to 25%, which slows the temperature rate of change to +5 degrees Celsius per second. Once the temperature reaches the lower control band 411, power is further reduced to 20%, which slows the temperature rate of change to +2 degrees Celsius per second. Once the temperature exceeds the target temperature 412 and reaches the upper control band 413, power is further reduced to 15%, which slows the temperature rate of change to −1 degrees Celsius per second, resulting in a reduction in temperature. Accordingly, the surface is heated at a gradually slower rate as the surface temperature approaches and/or exceeds the target temperature, and the temperature then remains stable within the upper 413 and lower 411 control bands. In this manner, by controlling the temperature rate of change and maintaining the surface temperature near the target temperature, thermal stress is reduced.

FIG. 5 illustrates a performance graph 500 for an anti-ice system that does not limit the temperature rate of change of a heated surface. Graph 500 includes a plot 506 of the temperature 502 of a heated surface over a period of time 504. In addition, graph 500 identifies a target temperature 512 for the heated surface, an upper control band 513, and a lower control band 511.

As shown by graph 500, the anti-ice system heats the surface by cycling full power on and off, resulting in rapid temperature fluctuations. For example, the surface is initially heated at full power, causing the temperature to increase at a fast rate. Once the temperature exceeds the target temperature 512 and reaches the upper control band 513, power is turned off, causing the temperature to decrease at a fast rate. Similarly, once the temperature falls below the target temperature 512 and reaches the lower control band 511, full power is turned back on, causing the temperature to again increase at a fast rate. Full power is continuously cycled on and off in this manner. As shown by graph 500, this approach causes rapid changes in temperature and results in overshooting and undershooting of the upper 513 and lower 511 control bands, which may cause thermal stress that leads to permanent damage. By contrast, the anti-ice system associated with FIG. 4 limits the temperature rate of change and maintains the surface temperature near the target temperature, thus reducing thermal stress and/or avoiding permanent damage.

Figure 6:
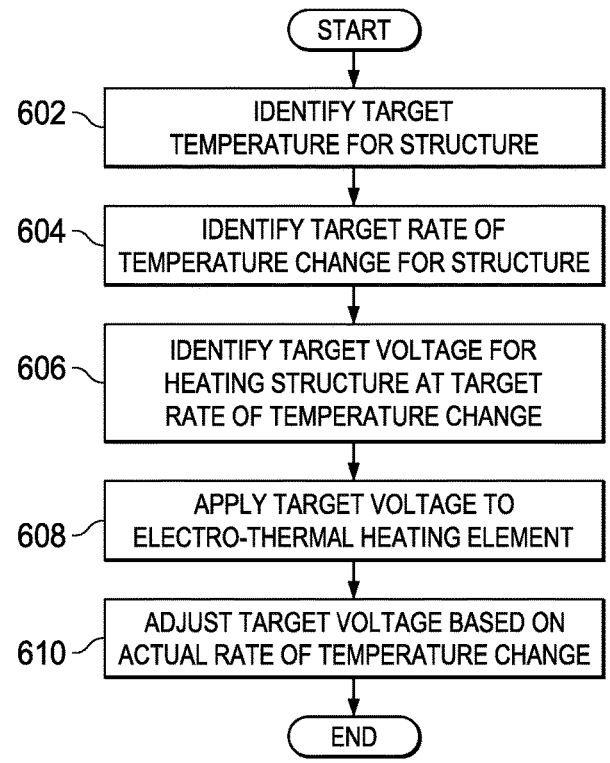
FIG. 6 illustrates a flowchart for an example embodiment of an anti-ice system.

FIG. 6 illustrates a flowchart 600 for an example embodiment of an anti-ice system. Flowchart 600 may be implemented, in some embodiments, using the anti-ice embodiments described throughout this disclosure.

The flowchart may begin at block 602 by identifying a target temperature for a structure. In some embodiments, for example, the structure may be a component that is susceptible to ice formation, and may be associated with an aircraft (e.g., a rotorcraft) or other type of vehicle. For example, on an aircraft, the structure may be a radome, windshield, engine inlet, wing, and/or rotor blade. Moreover, the structure may include an electro-thermal heating element for anti-icing purposes. Accordingly, the target temperature may be a temperature that prevents ice from forming on the structure without damaging the structure. For example, the structure may be susceptible to damage from thermal stress if it is heated above a particular threshold or "destruct" temperature, particularly if the structure is made of thermally fragile materials. In some embodiments, the target temperature may depend on various factors, such as the type of material the structure is made from, and/or the current operating conditions or environment, such as the current ambient temperature and/or speed of travel. In some embodiments, for example, the ambient temperature may be determined using an ambient temperature sensor.

The flowchart may then proceed to block 604 to identify a target rate of temperature change for the structure. For example, the structure may be susceptible to damage from thermal stress if its temperature changes rapidly, particularly if the structure is made of thermally fragile materials. Moreover, heating the structure too fast may inadvertently cause its temperature to rise above the target temperature and reach the destruct temperature, thus damaging the structure. Accordingly, it may be desirable to heat and/or cool the structure at an appropriate rate of temperature change to avoid thermal stress and damage. The target rate of temperature change may depend on various factors, such as the type of material the structure is made from, the target temperature, and/or the current surface temperature. For example, in some embodiments, a plurality of control bands may be defined for different temperature ranges relative to the target temperature, and each control band may use a particular rate of temperature change. Accordingly, the target rate of temperature change may be set using the rate for the control band containing the current surface temperature. In some embodiments, the current surface temperature may be determined using a temperature sensor embedded in the structure.

The flowchart may then proceed to block 606 to identify a target voltage for heating the structure at the target rate of temperature change. The flowchart may then proceed to block 608 to apply the target voltage to the electro-thermal heating element. In some embodiments, for example, an input voltage of a power source may be modulated to produce the target voltage. In some embodiments, the power source may include a multi-phase power bus configured to generate an alternating current, a relay circuit configured to enable and disable the alternating current, a rectifier circuit configured to convert the alternating current into a direct current, and/or a switching power supply configured to modulate a voltage of the direct current.

The flowchart may then proceed to block 610 to adjust the target voltage based on the actual rate of temperature change. For example, in some cases, the current environment or operating conditions may cause the temperature of the structure to change at rate that is faster or slower than the target rate of change. Accordingly, in some embodiments, the actual temperature rate of change may be monitored, and if it differs from the target rate, the target voltage may be adjusted in order to properly achieve the target rate.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure may be implemented using logic, instructions, and/or other information stored on any suitable type of tangible, non-transitory storage medium (e.g., random access memory (RAM), read only memory (ROM), field programmable gate arrays (FPGA), erasable programmable read only memory (EPROM), electrically erasable programmable ROM (EEPROM), microcode, magnetic and/or disc based storage mediums), software, hardware (for example, processor instructions or microcode), or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A system, comprising:
an electro-thermal heating element configured to heat a structure and comprising at least one resistance wire embedded into a surface of the structure in a pattern that enables heating of a surface of the structure without interfering with a function of the structure; and
a controller configured to:
identify a target temperature for the structure;
identify a target rate of temperature change for the structure;
identify a target voltage for heating the structure at the target rate of temperature change; and
apply the target voltage to the electro-thermal heating element;
wherein the target rate of temperature change for the structure is identified based on a type of material of the structure.

2. The system of claim 1, wherein the target temperature for the structure is identified based on a type of material of the structure.

3. The system of claim 1:
further comprising an ambient temperature sensor configured to identify an ambient temperature; and
wherein the target temperature for the structure is identified based on the ambient temperature.

4. The system of claim 1, wherein the structure is associated with an aircraft, and wherein the target temperature for the structure is identified based on an airspeed of the aircraft.

5. The system of claim 1:
further comprising a surface temperature sensor configured to identify a surface temperature of the structure; and
wherein the target rate of temperature change for the structure is identified based on the target temperature and the surface temperature.

6. The system of claim 5, wherein the controller configured to identify the target rate of temperature change for the structure is further configured to:
identify a control band associated with the surface temperature, wherein the surface temperature is within a temperature range associated with the control band, and wherein the control band is identified from a plurality of control bands associated with a plurality of temperature ranges and a plurality of rates of temperature change; and
identify the target rate of temperature change based on a rate of temperature change associated with the control band.

7. The system of claim 6, wherein each temperature range of the plurality of temperature ranges comprises a range of temperatures relative to the target temperature.

8. The system of claim 1, wherein the controller is further configured to:
identify an actual rate of temperature change for the structure;
identify a difference between the actual rate of temperature change and the target rate of temperature change; and
adjust the target voltage based on the difference between the actual rate of temperature change and the target rate of temperature change, wherein the target voltage is adjusted to heat the structure at the target rate of temperature change.

9. The system of claim 1, wherein the controller configured to apply the target voltage to the electro-thermal heating element is further configured to modulate an input voltage to produce the target voltage.

10. The system of claim 1, further comprising:
a multi-phase power bus configured to generate an alternating current;
a relay circuit configured to enable and disable the alternating current;
a rectifier circuit configured to convert the alternating current into a direct current; and
a switching power supply configured to modulate a voltage of the direct current.

11. An aircraft, comprising:
an electro-thermal heating element configured to heat a structure of the aircraft and comprising at least one resistance wire embedded into a surface of the structure in a pattern that enables heating of a surface of the structure without interfering with a function of the structure;
a surface temperature sensor configured to identify a surface temperature of the structure;
an ambient temperature sensor configured to identify an ambient temperature; and
a controller configured to:
identify a target temperature for the structure, wherein the target temperature is identified based on the ambient temperature;
identify a target rate of temperature change for the structure, wherein the target rate of temperature change is identified based on the target temperature and the surface temperature;
identify a target voltage for heating the structure at the target rate of temperature change; and
apply the target voltage to the electro-thermal heating element;
wherein the target rate of temperature change for the structure is identified based on a type of material of the structure.

12. The aircraft of claim 11, wherein the aircraft comprises a rotorcraft.

13. The aircraft of claim 11, wherein the target temperature for the structure is further identified based on a type of material of the structure.

14. The aircraft of claim 11, wherein the target temperature for the structure is further identified based on an airspeed of the aircraft.

15. The aircraft of claim 11, wherein the controller configured to identify the target rate of temperature change for the structure is further configured to:
identify a control band associated with the surface temperature, wherein the surface temperature is within a temperature range associated with the control band, and wherein the control band is identified from a plurality of control bands associated with a plurality of temperature ranges and a plurality of rates of temperature change; and identify the target rate of temperature change based on a rate of temperature change associated with the control band.

16. The aircraft of claim 11, wherein the controller is further configured to:
identify an actual rate of temperature change for the structure;
identify a difference between the actual rate of temperature change and the target rate of temperature change; and
adjust the target voltage based on the difference between the actual rate of temperature change and the target rate of temperature change, wherein the target voltage is adjusted to heat the structure at the target rate of temperature change.

17. The aircraft of claim 11, wherein the controller configured to apply the target voltage to the electro-thermal heating element is further configured to modulate an input voltage to produce the target voltage.

18. A non-transitory machine accessible storage medium having instructions stored thereon, wherein the instructions, when executed on a machine, cause the machine to:
identify a target temperature for a structure, wherein the target temperature is identified based on an ambient temperature;
identify a target rate of temperature change for the structure, wherein the target rate of temperature change is identified based on the target temperature, a type of material of the structure, and a surface temperature of the structure;
identify a target voltage for heating the structure at the target rate of temperature change; and
apply the target voltage to an electro-thermal heating element, wherein the electro-thermal heating element comprises at least one resistance wire embedded into a surface of the structure in a pattern that enables heating of a surface of the structure without interfering with a function of the structure.

19. The storage medium of claim 18, wherein the instructions that cause the machine to identify the target rate of temperature change for the structure further cause the machine to:
identify a control band associated with the surface temperature, wherein the surface temperature is within a temperature range associated with the control band, and wherein the control band is identified from a plurality of control bands associated with a plurality of temperature ranges and a plurality of rates of temperature change; and
identify the target rate of temperature change based on a rate of temperature change associated with the control band.

20. The storage medium of claim 18, wherein the instructions further cause the machine to:
identify an actual rate of temperature change for the structure;
identify a difference between the actual rate of temperature change and the target rate of temperature change; and
adjust the target voltage based on the difference between the actual rate of temperature change and the target rate of temperature change, wherein the target voltage is adjusted to heat the structure at the target rate of temperature change.

21. A method, comprising:
identifying a target temperature for a structure, wherein the target temperature is identified based on an ambient temperature;
identifying a target rate of temperature change for the structure, wherein the target rate of temperature change is identified based on the target temperature; a type of material of the structure, and a surface temperature of the structure;
identifying a target voltage for heating the structure at the target rate of temperature change; and
applying the target voltage to an electro-thermal heating element, wherein the electro-thermal heating element comprises at least one resistance wire embedded into a surface of the structure in a pattern that enables heating of a surface of the structure without interfering with a function of the structure.

22. The method of claim 21, wherein identifying the target rate of temperature change for the structure comprises:
identifying a control band associated with the surface temperature, wherein the surface temperature is within a temperature range associated with the control band, and wherein the control band is identified from a plurality of control bands associated with a plurality of temperature ranges and a plurality of rates of temperature change; and
identifying the target rate of temperature change based on a rate of temperature change associated with the control band.

23. The method of claim 21, further comprising:
identifying an actual rate of temperature change for the structure;
identifying a difference between the actual rate of temperature change and the target rate of temperature change; and
adjusting the target voltage based on the difference between the actual rate of temperature change and the target rate of temperature change, wherein the target voltage is adjusted to heat the structure at the target rate of temperature change.

\* \* \* \* \*